US012657177B2

(12) United States Patent
Kadu

(10) Patent No.: US 12,657,177 B2
(45) Date of Patent: Jun. 16, 2026

(54) PACKING MECHANISM FOR MITIGATING COLLISIONS AND IMPROVING EFFICIENCY FOR A HASH FUNCTION

(71) Applicant: Google LLC, Mountain View, CA (US)

(72) Inventor: Sachin Kadu, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/390,116

(22) Filed: Dec. 20, 2023

(65) Prior Publication Data

US 2025/0209052 A1     Jun. 26, 2025

(51) Int. Cl.
*G06F 16/22*          (2019.01)
(52) U.S. Cl.
CPC ................................. *G06F 16/2255* (2019.01)
(58) Field of Classification Search
CPC ............... G06F 16/2255; G06F 16/137; G06F 16/9014; G06F 12/1018
USPC .................................. 707/741, 747, 769, 770
See application file for complete search history.

(56) References Cited

U.S. PATENT DOCUMENTS

| | | | | |
|---|---|---|---|---|
| 5,032,987 | A * | 7/1991 | Broder .................... | H04L 69/00 711/221 |
| 5,555,405 | A | 9/1996 | Griesmer et al. | |

| | | | | |
|---|---|---|---|---|
| 5,848,423 | A * | 12/1998 | Ebrahim ................ | G06F 9/4488 711/E12.009 |
| 7,668,851 | B2 | 2/2010 | Triplett | |
| 7,965,297 | B2 * | 6/2011 | Hoppe ................. | G06F 16/5862 345/565 |
| RE45,086 | E | 8/2014 | Coldewey | |
| 10,320,568 | B1 * | 6/2019 | Mao ...................... | H04L 9/0894 |
| 2004/0230696 | A1 | 11/2004 | Barach et al. | |
| 2010/0217953 | A1 * | 8/2010 | Beaman .............. | G06F 16/2255 711/216 |
| 2013/0036277 | A1 * | 2/2013 | Szczepkowski ...... | G06F 3/0641 711/E12.001 |
| 2015/0095446 | A1 * | 4/2015 | Ramasubramanian ...................... | H04L 67/1008 709/214 |
| 2015/0121034 | A1 * | 4/2015 | Steele, Jr. ........... | G06F 12/1018 711/216 |
| 2020/0136971 | A1 | 4/2020 | Cohen | |

OTHER PUBLICATIONS

Extended European Search Report for European Patent Application No. 24221795.8 dated Apr. 17, 2025. 10 pages.

* cited by examiner

*Primary Examiner* — Phong H Nguyen

(74) *Attorney, Agent, or Firm* — Lerner David LLP

(57)          ABSTRACT

The technology generally relates to systems and methods for generating and maintaining hashed data. Data entries may be applied to a hash function so as to produce a hash value for each data entry, and data entries may have duplicative hash values to other data entries. Lookup tables may be configured to dynamically assign locations within a hash table to particular hash values based on data entries that are received. In addition, the data entries may be added to one or more hash tables so that the data entries are packed efficiently.

20 Claims, 9 Drawing Sheets

PACKING MECHANISM FOR MITIGATING COLLISIONS AND IMPROVING EFFICIENCY FOR A HASH FUNCTION

Hashing processes are used in a variety of applications to transform data entries of a large number space into a smaller number space. For example, hash functions are implemented in connection with checking the integrity or validity of passwords, data files, digital signatures, as well as in connection with computer networking applications. However, regardless of how good a hash function is, data entry collisions within the smaller number space will occur. Collisions within a hash table can result in particular an underutilization of the hash table. In addition, current mechanisms that accommodate for collisions can result in inefficiencies with regard to data lookup and retrieval.

BRIEF SUMMARY

The technology generally relates to systems and methods for generating and maintaining hashed data. Data entries may be applied to a hash function so as to produce a hash value for each data entry, and data entries may have duplicative hash values to other data entries. In accordance with aspects of the disclosure lookup tables can be maintained to associate data entries within corresponding hash values by identifying particular locations within a hash table as each being associated with a particular hash value. The lookup tables may also be configured to dynamically assign locations within a hash table to particular hash values based on data entries that are received. If the number of entries for a particular hash value are below a threshold for the hash table, then the entries may be associated with a single location within the hash table. However, with dynamic assignment of hash table locations, a particular hash value may be assigned to two or more different locations within one or more hash tables. In addition, the data entries may be added to one or more hash tables so that the data entries are located together, such as by occupying consecutive locations within a hash table, or by occupying adjacent memory locations.

In accordance with aspects of the disclosure, a system for maintaining hashed data may include: one or more electronic memories that are accessible by one or more processors, wherein the one or more processors are configured to: access, within the one or more electronic memories, a plurality of lookup tables, including at least a first lookup table and a second lookup table, wherein each of the plurality of lookup tables contains an index of a plurality of hash values, and wherein the plurality of lookup tables are configured to indicate for each hash value whether at least one associated data entry exists and to identify a location within a hash table when at least one associated data entry exists. The one or more processors may be further configured to arrange data entries within the hash table so as to occupy consecutive locations within the hash table.

In accordance with other aspects of the disclosure, the one or more processors may be further configured to: identify one or more data entries to be added to the hash table; and determine whether at least one of the first lookup table and the second lookup table are to be updated in connection with the one or more data entries, and if so update the index of hash values for least one of the first lookup table and the second lookup table with identifiers of one or more locations within the hash table corresponding to the one or more data entries. Determining whether at least one of the first lookup table and the second lookup table are to be updated may include determining whether one of the one or more data entries corresponds to a particular hash value that has been assigned to a hash table location that has been previously filled.

In accordance with still other aspects of the disclosure, the first lookup table associates the plurality of hash values with locations within a first hash table and the second lookup table associates the plurality of hash values with locations within a second hash table. In addition, the one or more processors may be configured to: identify a particular hash value that has been associated with a particular location within the first hash table; and determine if the particular location within the first hash table is filled. The one or more processors may be further configured to add a new data entry corresponding to the particular hash value to a particular location within the second hash table, if the particular location within the first hash table is filled. In addition, adding the new data entry may include updating the second lookup table so as to associate the particular location within the second hash table with the particular hash value.

In accordance with yet other aspects of the disclosure, the first lookup table and the second lookup table may each associate the plurality of hash values with locations within a shared hash table, and the one or more processors may be configured to allow a particular hash value to be assigned by the first lookup table to a first location within the shared hash table and the particular hash value to be assigned by the second lookup table to a second location within the shared hash table. The one or more processors may be further configured to arrange data entries within the shared hash table so as to occupy consecutive locations within the shared hash table.

In accordance with aspects of the disclosure, a method for maintaining hashed data may include receiving, by one or more processors, a hash value; accessing, by the one or more processors, a first lookup table and a second lookup table to determine whether one or more existing data entries are associated with the hash value, wherein each of the first lookup table and the second lookup tables contain an index of a plurality of hash values, and wherein the plurality of lookup tables are configured to indicate for each hash value whether at least one associated data entry exists and to identify a location within a hash table when at least one associated data entry exists; and if one or more associated data entries exist, identify one or more hash table locations for the one or more associated data entries based on the location information within at least one of the first lookup table and the second lookup table.

In other aspects of the disclosure, the method may include identifying, by the one or more processors, one or more data entries to be added to the hash table; determining, by the one or more processors, whether at least one of the first lookup table and the second lookup table are to be updated in connection with the one or more data entries; and if so, updating, by the one or more processors, the index of hash values for least one of the first lookup table and the second lookup table with identifiers of one or more locations within the hash table corresponding to the one or more data entries. In addition, determining whether at least one of the first lookup table and the second lookup table are to be updated may include determining whether one of the one or more data entries corresponds to a particular hash value that has been assigned to a hash table location that has been previously filled. The one or more data entries may be added to the hash table at a location that is consecutive with existing data entries within the hash table.

In accordance with still other aspects of the disclosure, the first lookup table associates the plurality of hash values with locations within a first hash table and the second lookup table associates the plurality of hash values with locations within a second hash table. The method may include identifying, by the one or more processors, a particular hash value that has been associated with a particular location within the first hash table; and determining, by the one or more processors, if the particular location within the first hash table is filled. In addition, the method may include adding, by the one or more processors, a new data entry corresponding to the particular hash value to a particular location within the second hash table, if the particular location within the first hash table is filled. Adding the new data entry may include updating the second lookup table so as to associate the particular location within the second hash table with the particular hash value.

In accordance with yet other aspects of the disclosure, the first lookup table and the second lookup table each associate the plurality of hash values with locations within a shared hash table, and wherein the one or more processors are configured to allow a particular hash value to be assigned by the first lookup table to a first location within the shared hash table and the particular hash value to be assigned by the second lookup table to a second location within the shared hash table. In addition, the method may include arranging, by the one or more processors, data entries within the shared hash table so as to occupy consecutive locations within the shared hash table.

BRIEF DESCRIPTION OF THE DRAWINGS

FIG. 6 is a diagram of a hash table chart identifying the number of data entries at locations within a hash table.

FIG. 7 is a diagram of a hash table chart identifying locations in which no data entries exist.

DETAILED DESCRIPTION

Disclosed systems and methods herein provide for improved generation and maintenance of hashed data. The systems disclosed herein can be implemented in connection with numerous applications in which a hash function is used to generate hash values from a data set, as well as applications in which hashed data sets are to be accessed. Hashing can include any function or mechanism by which a large data entry, or number space, is transformed to a smaller hash value, or smaller number space. For example, MAC addresses can take the form of 48-bit data strings, which can be hashed into a smaller index that limits the size of the MAC address table, and avoid having to implement all possible $2^{48}$ entries. Hashing is also used in connection with ternary content-addressable memory (TCAM), internet protocols, and other applications, In connection with such applications, hashed data can be more efficiently managed in accordance with aspects of the disclosure, so as to improve the performance of devices that generate and use hashed data.

Figure 1:
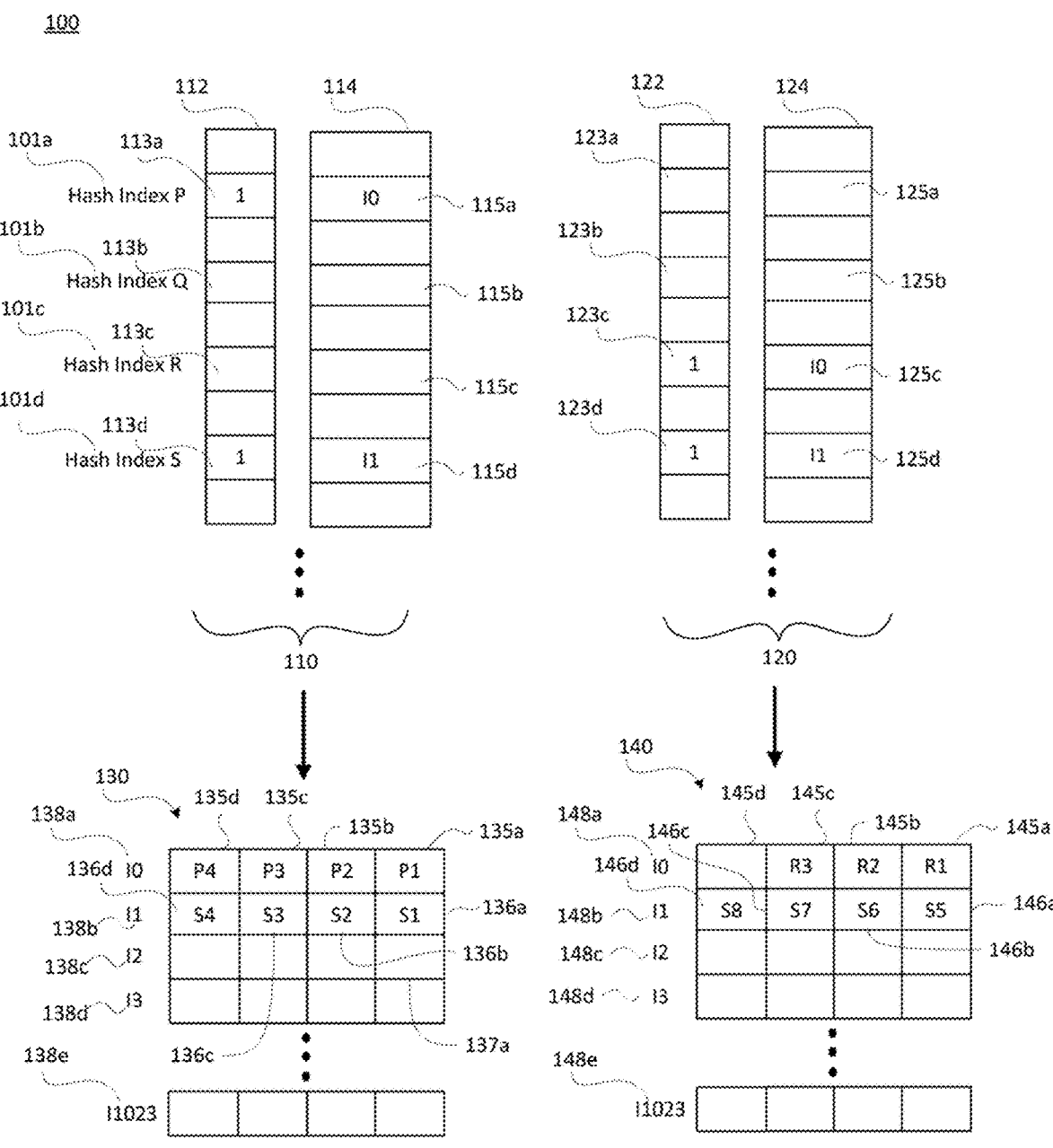
FIG. 1 is a block-diagram of hashed-data architecture according to aspects of the disclosure.

FIG. 1 is a block-diagram 100 of an architecture for maintaining and accessing hashed data in accordance with aspects of the disclosure. The architecture of block-diagram 100 may exist on one or more computing devices, such as one or more servers, having one or more processors configured to generate and maintain data as disclosed herein. The data that is generated and maintained can include a plurality of data entries, each of which can be hashed using a hash function. For example, a particular hash function may be applied to a data entry, so as to produce some hash value, and a collision occurs when more than one of the data entries produces the same hash value.

The architecture of block-diagram 100 includes a first lookup table 110, a second lookup table 120, a first hash table 130, and a second hash table 140. Lookup tables 110 and 120 each include an index of hash values 101*a-d*, as well as an identifier array 112/122 and a memory-location array 114/124. For each hash value 101*a-d*, the identifier array 112/122 can be configured to indicate whether at least one data entry exists within a corresponding hash table 130/140 for each of the hash values 101*a-d*. In addition, for each hash value 101*a-d* in which a data entry exists within a corresponding hash table 130/140, the memory-location array 114/124 is configured to identify the location of the data entry within the corresponding hash table 130/140.

Hash tables 130/140 can vary in configuration in accordance with the parameters of particular applications for which the hashed data is being used. In block-diagram 100, hash tables 130/140 are each configured as 1024-by-4 data arrays that allow for data entries to be stored in accordance with up to 1024 different hash values, with each hash value having up to four different data entries within a given hash table 130/140. For example, in hash table 130, each of the 1024 hash table locations 138*a-e* can correspond to a different hash value, and at each hash table location 138*a-e* contains four separate positions in order to store up to four separate data entries at a given location 138*a-e* within hash table 130. At hash table location 138*a*, data entries P1-P4 are stored in positions 135*a-d*, respectively. Lookup table 110 can be used to associate P1-P4 data entries with the particular hash value 101*a* by having memory-location position 115*a*, within memory-location array 114, indicate hash table location 138*a*. Similarly, data entries S1-S4 are associated with the hash value 101*d*, as memory-location position 115*d* identifies hash table location 138*b*.

If more than four data entries are needed for a particular hash value, the system of block-diagram 100 can be configured to use both hash tables 130 and 140 in order to maintain and access the data entries for that particular hash value. For example, hash value 101*d* corresponds to a "Hash Index S," in which there are eight data entries S1-S8. In block-diagram 100, data entries S1-S4 have been stored at location 138*b* of hash table 130, while data entries S5-S8 have been stored at location 148*b* of hash table 140. Accordingly, lookup tables 110 and 120 each indicate that their respective hash tables 130 and 140 contain data entries for hash value 101*d*. In particular, identifier array 112 of lookup table 110 contains a "1" at indicator array position 113*d*, while identifier array 122 of lookup table 120 contains a "1" at indicator array position 123*d*. In addition, memory-location position 115*d* of memory-location array 114 indicates that data entries for hash value 101*d* are located at hash table location 138*b* of hash table 130, while memory-location position 125*d* of memory-location array 124 indicates that data entries for hash value 101*d* are located at hash table location 148*b* of hash table 140. Lookup tables 110 and 120 can therefore be used to identify the associated locations for all data entries of a particular hash value across both hash tables 130 and 140.

If one or more data entries are to be added to hash table 130 or 140, the data entries can either be added to a new location within the hash table or to an available position at a hash table location that already contains other data entries. For example, if a data entry that has a hash value "R" is to be added to either hash table 130 or 140, the a computing device can access lookup tables 110 and 120 to determine whether any other data entries currently are stored in hash table 130 or 140 in connection with the hash value "R". In block-diagram 100, lookup table 110 does not indicate that hash table 130 contains the "R" hash value 101*c*, as indicator array position 113*c* does not contain an indicator of an entry being present. However, indicator array position 123*c* of lookup table 120 does contain an indicator of an entry being present, and memory location position 125*c* indicates the location of the one or more entries within hash table 140. In addition, location 148*a* of hash table 140 can be accessed and a determination can be made that location 148*a* contains two data entries R1 and R2, with positions 145*c* and 145*d* at location 148*a* being empty. Thus, the new data entry having hash value "R" can be added to hash table 140 at empty position 145*c* or 145*d*. The addition of the new data entry to position 145*c/d* at location 148*a* does not require updating lookup table 120, as lookup datable 120 already indicates that "R" hash values 101*c* are contained at location 148*a* of hash table 140.

In other instances, a new data entry may need to be added to a previously-empty location within hash table 130 or 140. For example, in block-diagram 100, there are currently four data entries P1-P4 located within hash table 130, thereby filling positions 135*a-d* of location 138*a*. If a new data entry with hash value "P" is to be added, it cannot be added to the filled location 138*a*. However, lookup table 120 indicates that there are currently no data entries within hash table 140 that have the hash value "P". Thus, the new data entry can be added to hash table 140. As shown in block-diagram 200 of FIG. 2, a new data entry "P5" has been added to hash table 140 at position 147*a* of the hash table location 148*b*. In addition, indicator array 122 and memory-location array 124 of lookup table 120 have been updated, so as to indicate the presence of a data entry within hash table 120 with the "P" hash value 101*a*, as well as indicating the location of the data entry within hash table 120. Thus, lookup tables 110 and 120 can be used to identify and access, via hash tables 130 and 140, all five of the data entries P1-P5 that have the corresponding "P" hash value.

In addition, data entries may be removed from hash tables 120/130, and once removed, the newly-available positions within hash tables 120/130 can be used for other data entries. For example, data entries R1 and R2 may be determined to be longer be valid, and so may need to be removed from hash table 140. In addition, a new data entry Q1 may need to be added to lookup tables 110/120 and hash tables 130/140. As shown in block-diagram 300 of FIG. 3, data entries R1 and R2 have been removed from hash table 140 and a new data entry Q1 has been added to location 148*a*.

In connection with these changes, lookup table 120 has been updated so as to remove indications for data entries R1 and R2 associated with the "R" hash value 101*c*, and add an indication and location for the data entry Q1, which is associated with the "Q" hash value 101*b*.

Thus, the locations 138*a-e* and 148*a-e* of hash tables 130 and 140 can be dynamically updated to correspond with different hash values based on updates to lookup tables 110 and 120, in that locations within hash tables 130/140 are not statically assigned to a particular hash value, but may be updated to different hash values in accordance with lookup tables 110/120. This dynamic updating of data entries can allow for efficient packing of hash tables 130/140, in that hash values can be assigned the appropriate number of hash table locations as new data entries are received, and new data entries can be assigned the next available location within hash tables 130/140, as needed. In addition, in connection with the architecture shown in FIGS. 1-3, only hash values having more than four data entries will require more than one hash table location. Accordingly, there is limited wastage with regard to hash table usage, as unused hash value locations within hash tables 130/140 can be used for a greater number of overall hash values, and hash tables 130/140 may each have dynamic sizes that correspond to the overall number of hash values for which data entries currently exist.

Figure 2:
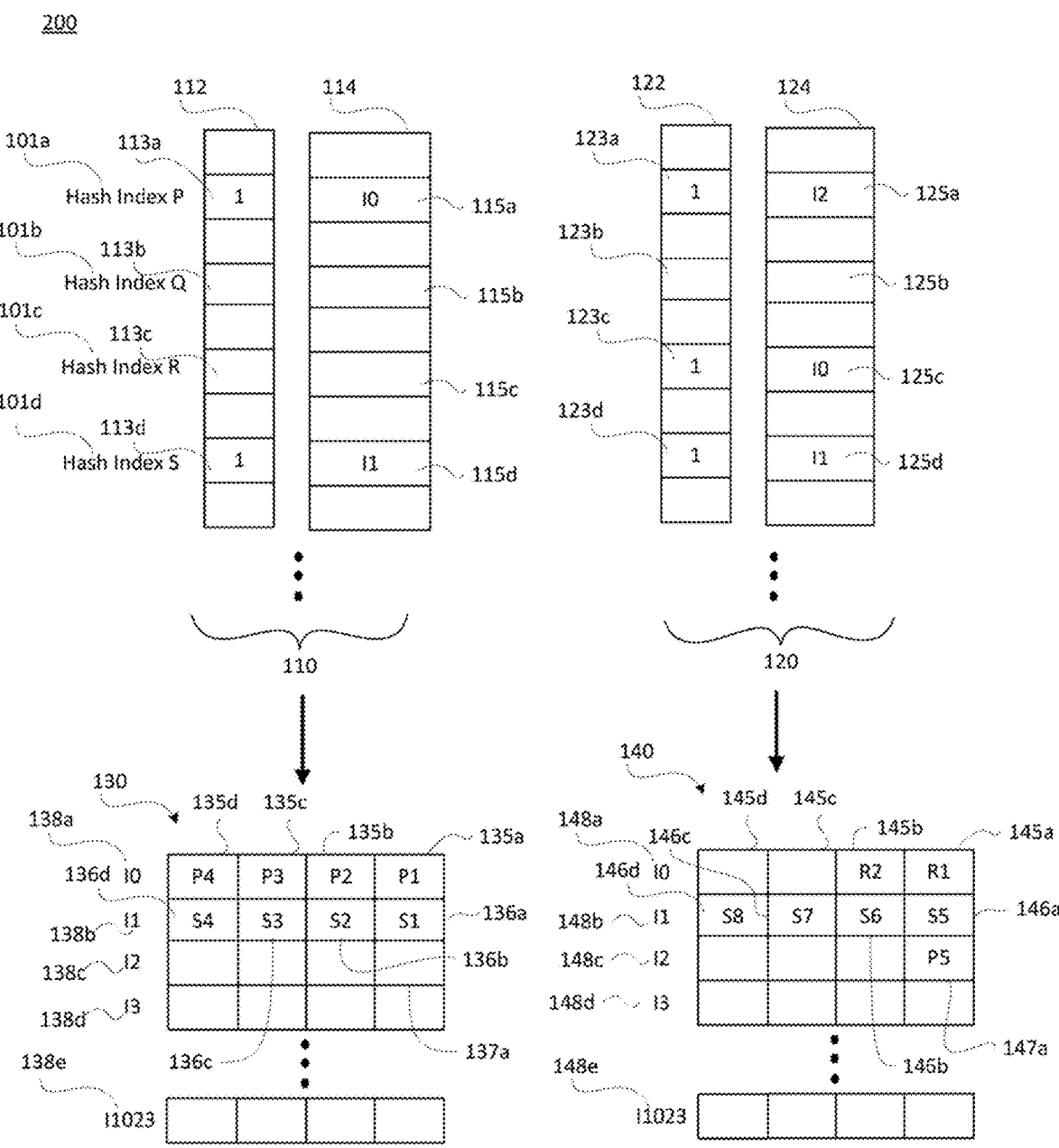
FIG. 2 is a block-diagram of hashed-data architecture that has been updated in accordance with aspects of the disclosure.
Figure 3:
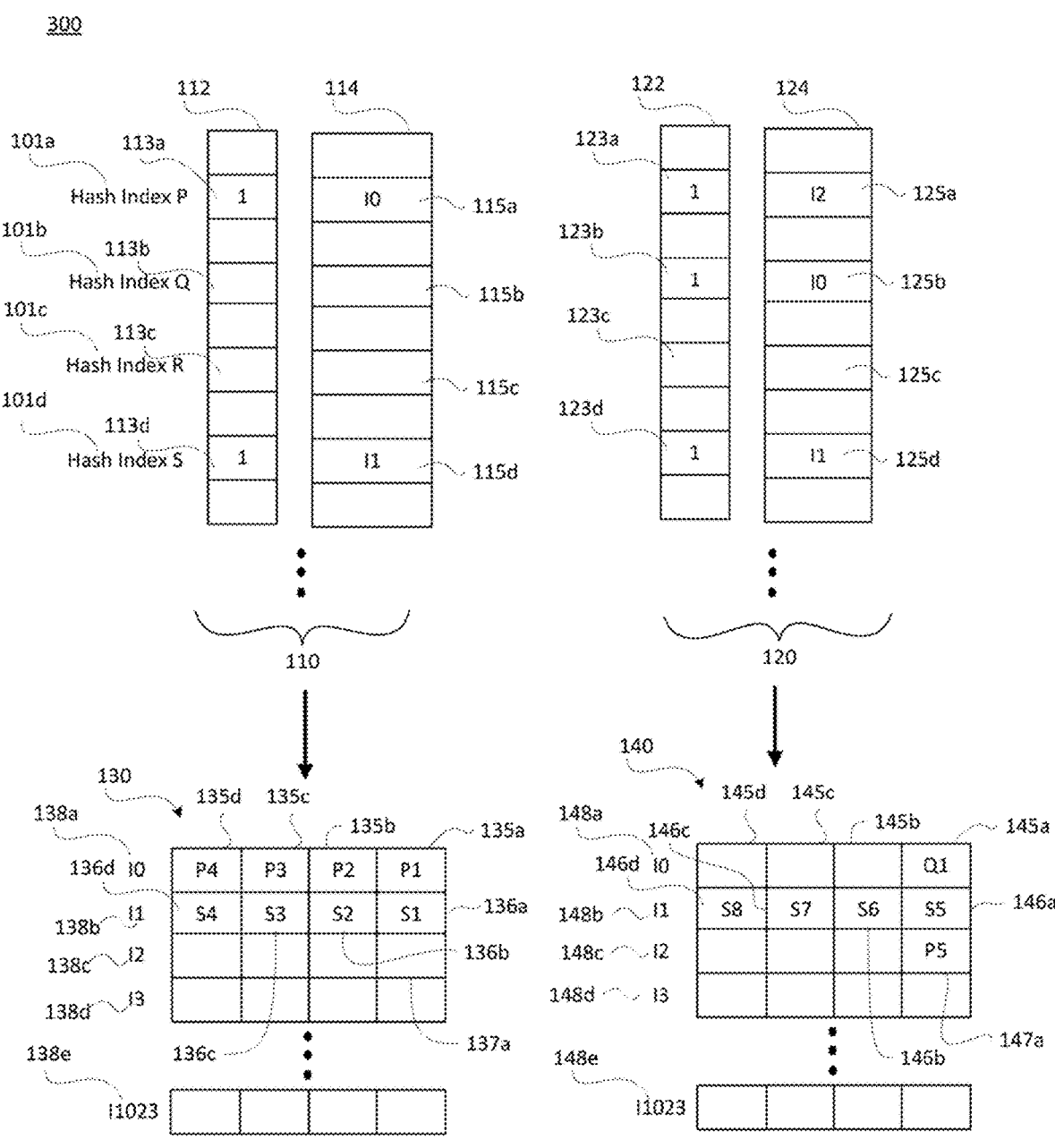
FIG. 3 is a block-diagram of hashed-data architecture that has been further updated in accordance with aspects of the disclosure.
Figure 4:
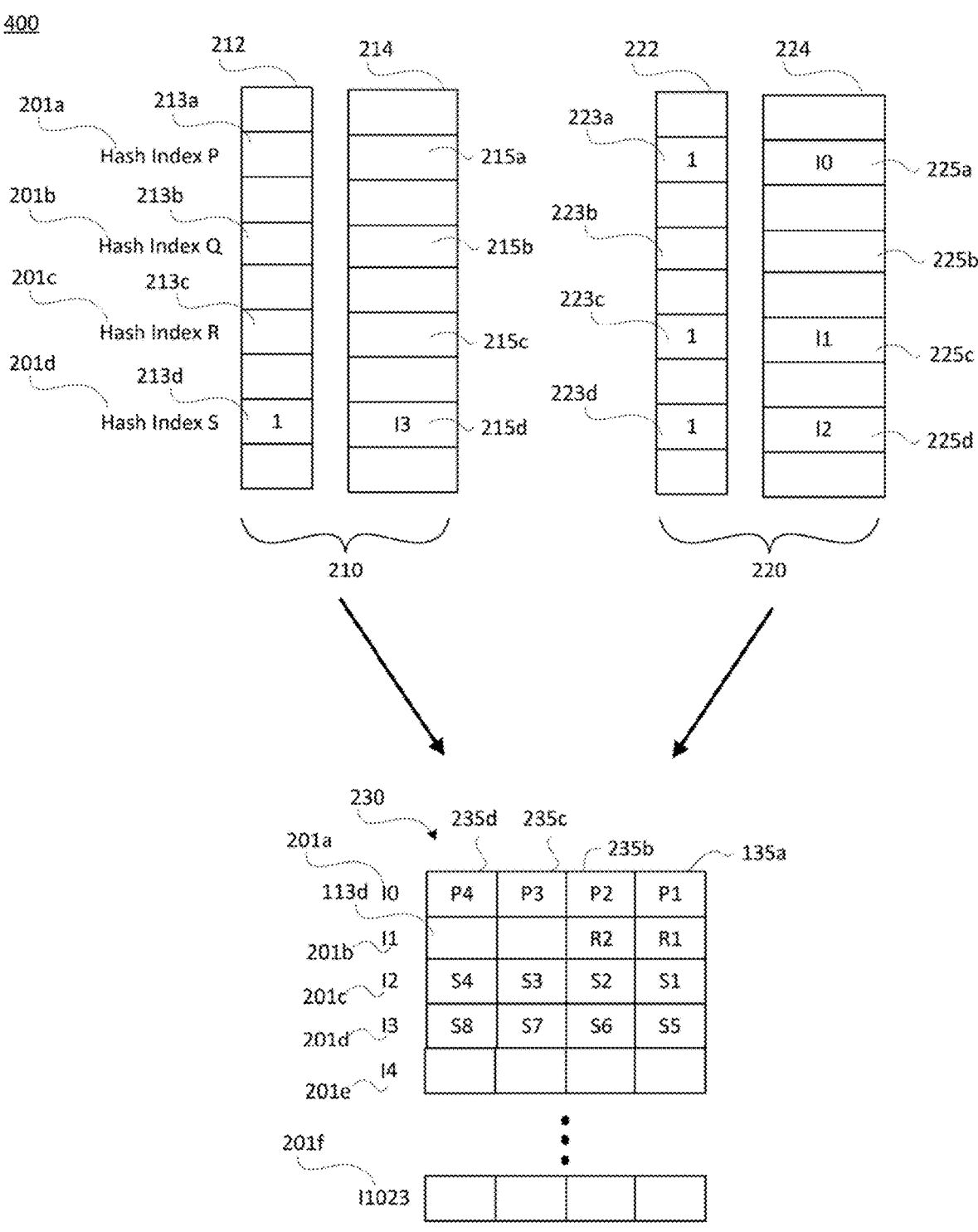
FIG. 4 is a block-diagram of hashed-data architecture in which lookup tables share a hash table in accordance with aspects of the disclosure.
Figure 5:
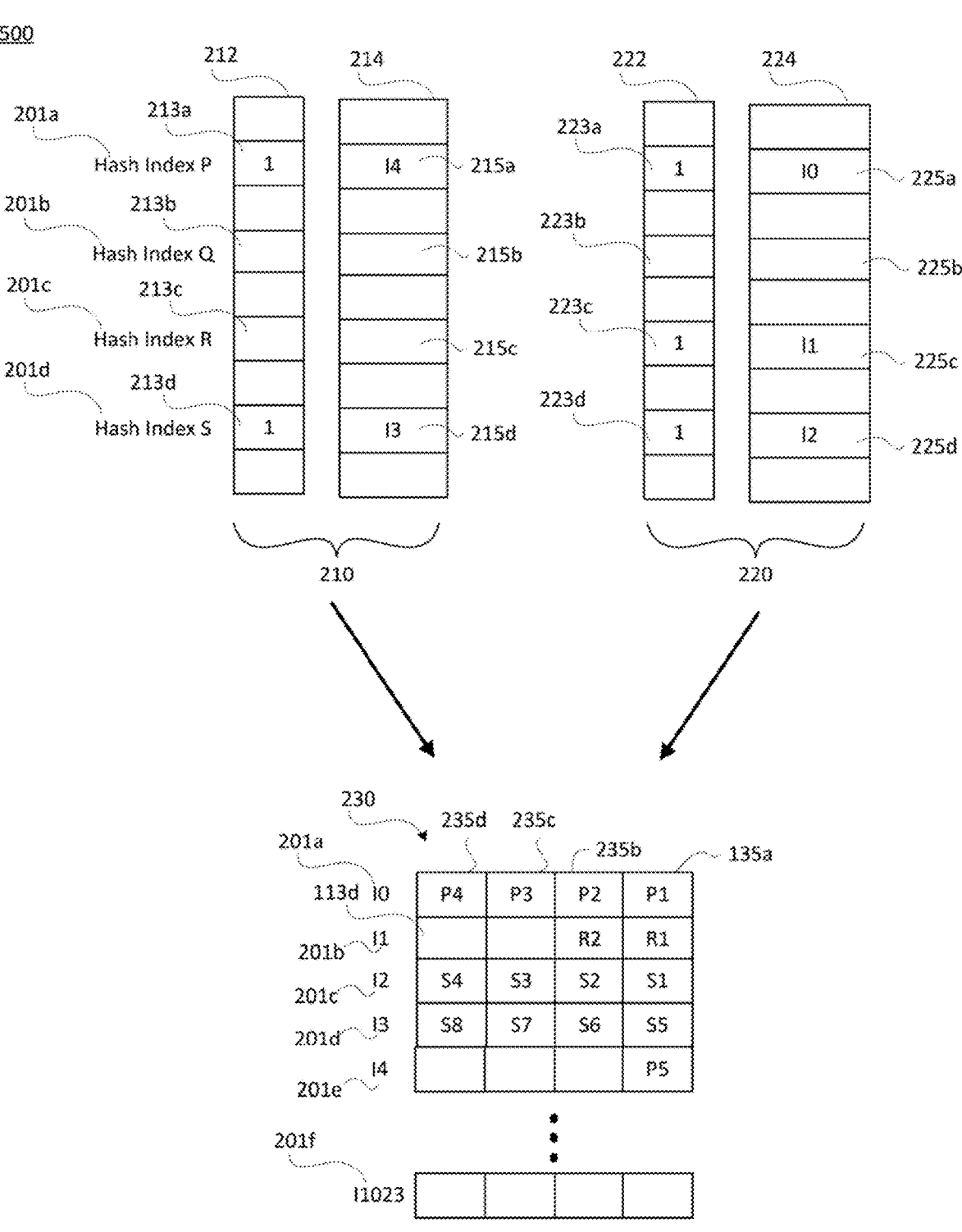
FIG. 5 is a block-diagram of hashed-data architecture in which a shared hash table and lookup tables have been updated in accordance with aspects of the disclosure.

The lookup table 110/120 and hash table 130/140 architecture of FIGS. 1-3 can be extended to any number of lookup tables and hash tables, in which each lookup table is associated with a particular set of memory locations that make up a corresponding hash table. In addition, the systems and methods described herein may be altered so that more than one lookup table corresponds to a single set of memory locations. For example, FIG. 4 is a block-diagram 400 of an architecture in which two lookup tables 210 and 220 are each associated with a shared hash table 230. For any hash value 201*a-d*, lookup table 210 and 220 can each identify a location 201*a-f* within hash table 230. For example, lookup table 220 identifies the existence and location of data entries associated with "P," "R," and "S" hash values 201*a, c,* and *d,* which are located within hash table 230 at locations 201*a-c*. Lookup table 210 also identifies the existence of data entries with the "S" hash value 201*d* at hash table location 201*d*. If data entries for a new hash value are to be added to hash table 230, the data entries can be added to hash table location 201*e*. Similarly, if another "P" hash value is to be added to hash table 230, it can be added to location 201*e*, in that location 201*a* is already filled with four data entries P1-P4. In this example, lookup table 210 can be updated to identify the new data entry P5, as is shown in block-diagram 500 of FIG. 5.

Figure 6:
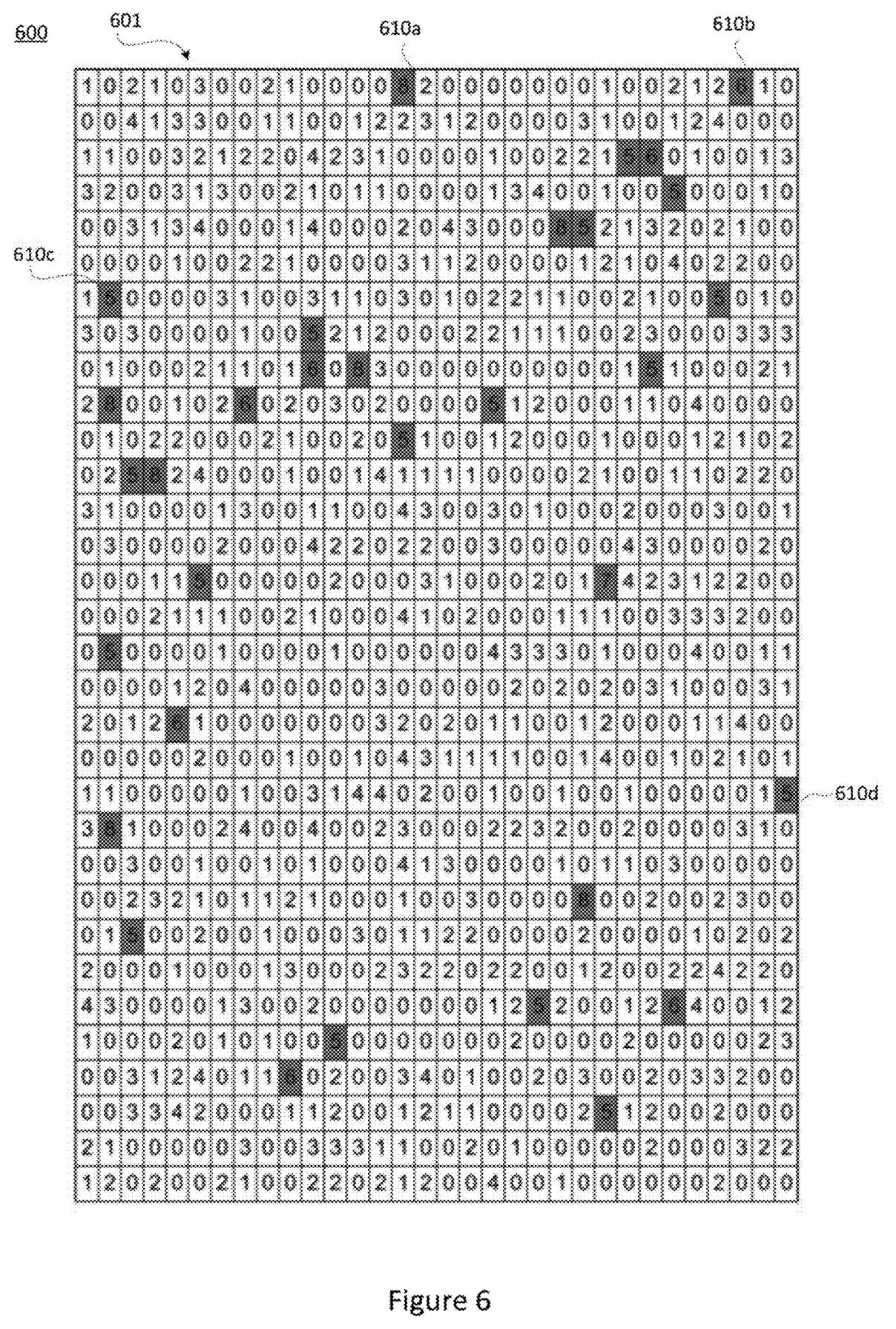

As disclosed herein, two or more lookup tables may assign data entries having the same hash value, which can avoid excessive collisions from occurring. For example, a hash table configured to have 1024×4 entries will typically only accommodate four entries for each hash value. However, a hash function may assign more than four data entries to a particular hash value. For example, FIG. 6 is a chart 600 of a hash table 601 in which a CRC32 function has been chosen to randomly distribute 1024 entries to 1024 different hash values within the 1024×4 hash table 601. The shaded locations, such as 610*a-d*, each represent a location in which more than four entries have been assigned to a particular hash value within the table. However, as described herein, more than one lookup table may be used so as to dynamically assign these data entries to different locations within the hash table, while maintaining the hash value with which the data entries are associated.

Figure 7:
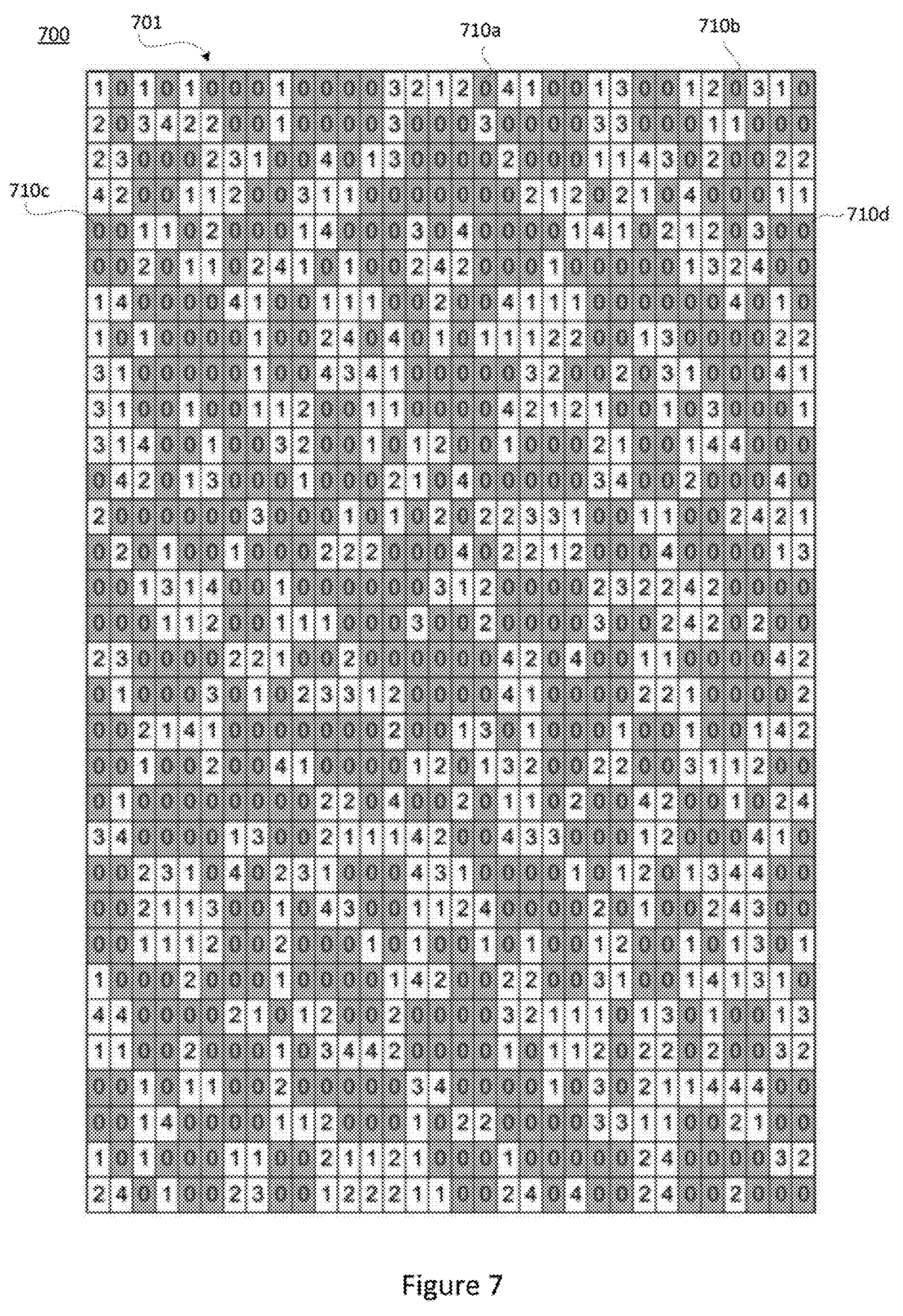

In addition, the disclosed systems and methods can more efficiently access stored data entries and determine whether any data entries exist for particular hash values. For example, FIG. 7 is a chart 700 of hash table 701 in which a CRC32 function has randomly distributed 1024 entries to 1024 different hash values within the 1024×4 hash table 701. The shaded locations, such as 710a-d, each represent a location in which there are no data entries. If each location represents a different hash value within hash table 701, then there are a large number of hash values for which there are no data entries. Having to access hash table 701 in order to determine whether a data entry exists for a particular hash value can be inefficient. For example, the hash table 701 may reside on an external memory or on a separate chip, such as a DRAM or a high-bandwidth memory (HBM) that is connected to one or more processors of a computing unit that is attempting to access the external or remote hash table. In accordance with aspects of the disclosure, the computing unit may have local access to lookup tables described herein, and may therefore determine that particular hash values do not have any associated data entries without requiring the computing unit to access the external hash table that resides on a DRAM or HBM. Thus, the management of lookup tables described herein can allow for improved performance of the computing unit, such as by limiting the number of requests and/or the bandwidth that is needed between the computing unit and an external memory.

In addition, by dynamically packing the data entries into locations within the one or more hash tables, the disclosed systems can limit the size of the memory being occupied by the active hash table values and can reduce the size of a hash table that is needed for a given application. For example, an application for maintaining MAC addresses may require a typical hash table to contain 64,000 hash values, in order to prevent excess collisions between MAC addresses that are associated with a given hash table. However, in configuring lookup tables to dynamically allocate hash table locations in the manners disclosed herein, hash values with a large number of data entries may be assigned to more than one hash table location. Accordingly, a smaller hash table of 8,000 or 16,000 hash values may be used without resulting in an excess of data entry collisions.

Figure 8:
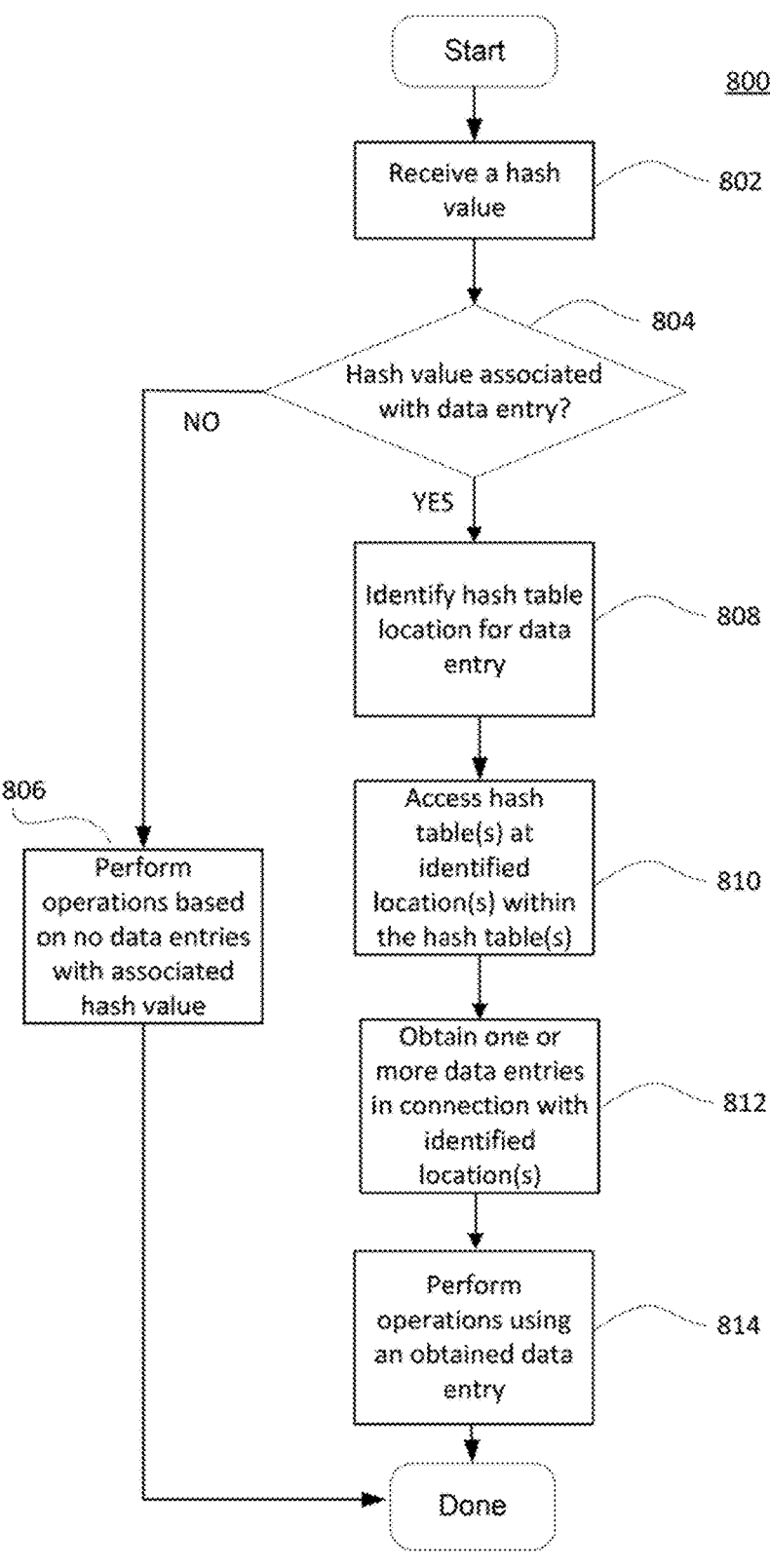
FIG. 8 is a flow-diagram for using lookup tables in accordance with aspects of the disclosure.

FIG. 8 is a flow-diagram 800 of operations that can be performed by a system in accordance with aspects of the disclosure. For example, one or more computing devices, such as one or more servers, may have access to lookup tables described herein, and may perform operations in connection with accessing data entries within a hash table that may be stored locally or remotely relative to the server. Although operations are described in a particular order, one or more of the operations may occur in a different order or simultaneously in accordance with aspects of the disclosure. Additional operations may also be added or operations removed in accordance with aspects of the disclosure.

In block 802, the computing device may receive a communication that includes a hash value. The computing device may then determine whether the particular hash value is associated with data entries that have been stored within a hash table (block 804). As disclosed herein, this determination may be performed by accessing lookup tables that have been configured to identify the existence and location of data entries for any given hash value. If the lookup tables indicate that no data entry exists for the received hash value, the computing device may perform operations in accordance with there being no related data entries (block 806). However, if one or more of the lookup tables identifies the existence of a data entry in connection with the received hash value, then the computing device may use the lookup tables to identify the hash table locations for the one or more data entries (block 808). The computing device may then access one or more hash tables at one or more locations identified by the lookup tables. More than one lookup table may identify data entries associated with the received hash value, and each lookup table may identify a different location within the same or different hash table. In block 812, the computing device may obtain one or more data entries from the one or more hash table locations identified in the lookup tables. The computing device may then use the data entries that have been obtained to perform one or more operations (block 814).

Figure 9:
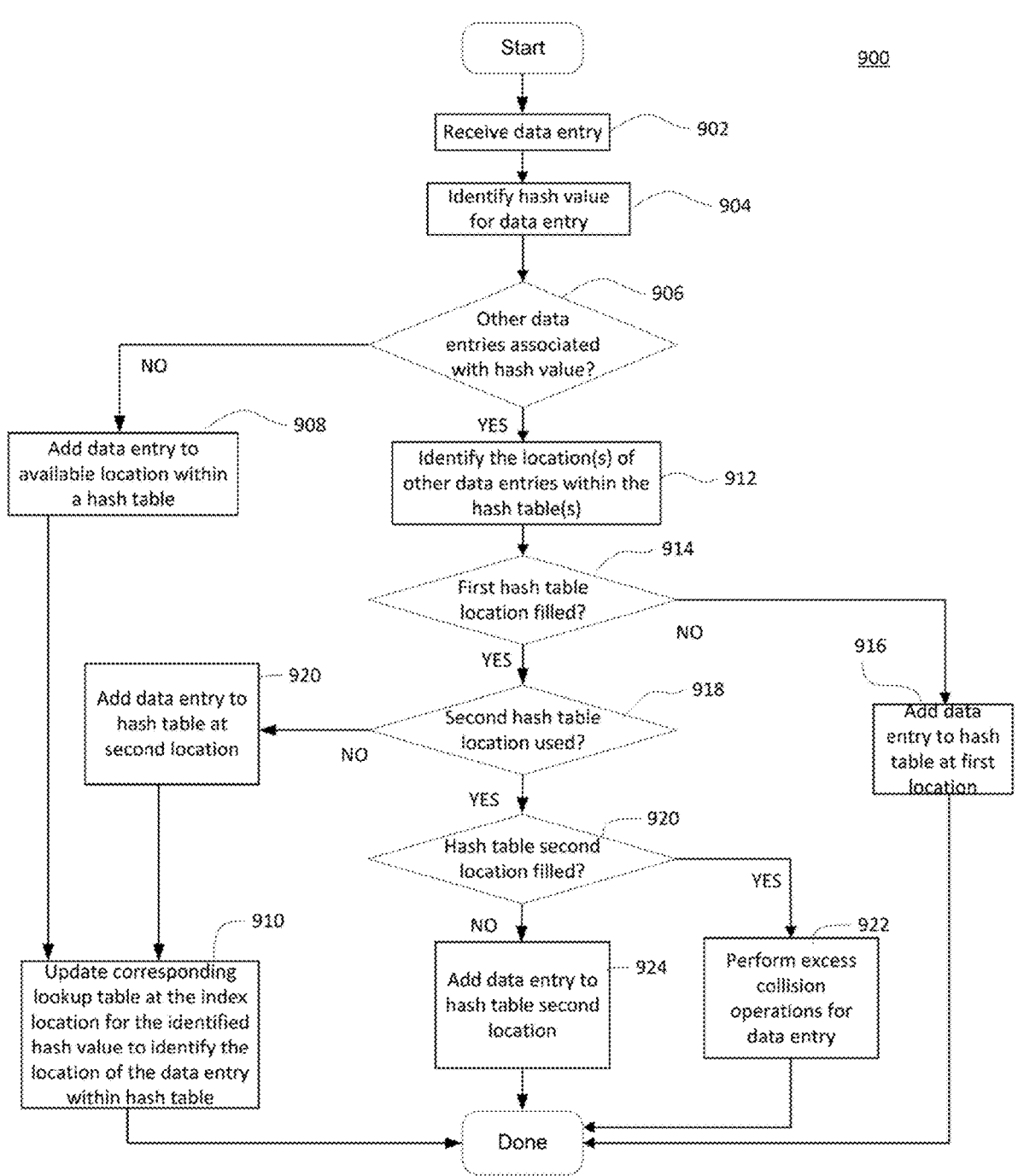
FIG. 9 is a flow-diagram for adding a data entry to a hash table in accordance with aspects of the disclosure.

FIG. 9 is a flow-diagram 900 of operations that can be performed by a system in accordance with aspects of the disclosure. For example, one or more computing devices, such as one or more servers, may have access to lookup tables and hash tables described herein, and may perform operations in connection with adding data entries to the hash table. Although operations are described in a particular order, one or more of the operations may occur in a different order or simultaneously in accordance with aspects of the disclosure. Additional operations may also be added or operations removed in accordance with aspects of the disclosure.

In block 902, the computing device can receive a data entry that is to be included within a hash table. The computing device may identify the hash value of the data entry (block 904), such as by performing a hash function on the data entry. In block 906, the computing device may determine whether other data entries are associated with the identified hash value. This may be performed by accessing lookup tables described herein, and determining, based on the lookup table whether the identified hash value is associated with at least one data entry. If the lookup tables indicate that no data entry is currently associated with the identified hash value, the computing device can be configured to add the data entry to an available location within a hash table (block 908). As described herein, the hash table can be updated to include the added data entry in a manner that packs the added data entry relative to existing data entries within the hash table. For example, the computing device may identify the next available location within a consecutive series of hash table locations, or may identify a memory location that is adjacent to another memory location that is currently being occupied by a data entry for the hash table. Accordingly, the data entries may be dynamically packed into the one or more hash tables. In block 910, a lookup table is updated in connection with the added data entry, so as to identify the existence of a data entry having the identified hash value and to identify the location of the data entry within the hash table.

Returning to block 906, if other data entries are found to be associated with the identified hash value, the computing device can access a lookup table to identify the location of the other data entries (block 912). The computing device may then determine whether a first hash table location has been filled with the previous data entries (block 914). For example, if the hash table is 1024×4, then each of the 1024 locations within the hash table will be filled once four data entries are assigned to the location. If the first hash table location has not been filled, the new data entry can be added to the hash table at the first location (block 916). If the first hash table location is filled, a determination can be made whether a second hash table location is currently being used for data entries of the identified hash value. If a second hash table location is not currently being used, the data entry can be added to the second hash table location (block 920). As disclosed herein, the lookup tables may be connected with different hash tables or may be configured to be connected with the same hash table. Thus, the second location may constitute a separate hash table from the first hash table location, or may constitute a different location within the same hash table. In block 910, a lookup table is updated to identify the hash value as being located within the second hash table location.

Returning to block 918, if a second hash table location is currently being used for data entries associated with the identified hash value, a determination can be made whether the second location has been filled (block 920). If the second location has been filled, the computing device may perform one or more excess collision operations (block 922), including for example, sending a notification that the data entry could not be added to existing hash tables. If the second hash table location is not filled, then the data entry can be added to the second location (block 924).

While flow-diagram 900 refers to a first and second location, the methods disclosed herein may be used in connection with more than two hash table locations. For example, more than two lookup table may be used in connection with more than two hash tables, so that a third hash table location is available in connection with a third lookup table. This can also be extended to a fourth hash table location and fourth lookup table, and so on.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples. Further, the same reference numbers in different drawings can identify the same or similar elements.

The invention claimed is:

1. A system for maintaining hashed data comprising:
one or more electronic memories that are accessible by one or more processors, wherein the one or more processors are configured to:
access, within the one or more electronic memories, a plurality of lookup tables, including at least a first lookup table and a second lookup table, wherein each of the plurality of lookup tables contains an index of a plurality of hash values associated with a particular hash function, and wherein each of the plurality of lookup tables are configured to indicate for each hash value whether at least one associated data entry exists and to identify a location within a hash table when at least one associated data entry exists; and
maintain the plurality of lookup tables so as to allow data entries associated with a given hash value to be divided into a first subset of data entries identified by the first lookup table and a second subset of data entries identified by the second lookup table.

2. The system of claim 1, wherein the one or more processors are further configured so that the first lookup table associates a particular hash value to a first hash table location and the second lookup table associates the particular hash value to a second hash table location.

3. The system of claim 1, wherein the one or more processors are further configured to:
identify one or more data entries to be added to the hash table;
determine whether at least one of the first lookup table and the second lookup table are to be updated in connection with the one or more data entries, and if so update the index of hash values for least one of the first lookup table and the second lookup table with identifiers of one or more locations within the hash table corresponding to the one or more data entries.

4. The system of claim 3, wherein determining whether at least one of the first lookup table and the second lookup table are to be updated comprises determining whether one of the one or more data entries corresponds to a particular hash value that has been assigned to a hash table location that has been previously filled.

5. The system of claim 1, wherein the first lookup table associates the plurality of hash values with locations within a first hash table and the second lookup table associates the plurality of hash values with locations within a second hash table.

6. The system of claim 5, wherein the one or more processors are further configured to:
identify a particular hash value that has been associated with a particular location within the first hash table; and
determine if the particular location within the first hash table is filled.

7. The system of claim 6, wherein the one or more processors are further configured to add a new data entry corresponding to the particular hash value to a particular location within the second hash table, if the particular location within the first hash table is filled.

8. The system of claim 7, wherein adding the new data entry comprises updating the second lookup table so as to associate the particular location within the second hash table with the particular hash value.

9. The system of claim 1, wherein the first lookup table and the second lookup table each associate the plurality of hash values with locations within a shared hash table, and wherein the one or more processors are configured to allow a particular hash value to be assigned by the first lookup table to a first location within the shared hash table and the particular hash value to be assigned by the second lookup table to a second location within the shared hash table.

10. The system of claim 1, wherein the hash table comprises one or more hash tables that are stored remotely from the first lookup table and second lookup table, and wherein the one or more processors are further configured to be able to access the first lookup table and the second lookup table and determine, without accessing the one or more hash tables, if no data entries have been associated with a particular hash value.

11. A method for maintaining hashed data comprising:
receiving, by one or more processors, a hash value;
accessing, by the one or more processors, a first lookup table and a second lookup table to determine whether one or more existing data entries are associated with the hash value, wherein each of the first lookup table and the second lookup tables contain an index of a plurality of hash values associated with a particular hash function, and wherein each of the plurality of lookup tables are configured to indicate for each hash value whether at least one associated data entry exists and to identify a location within a hash table when at least one associated data entry exists, and wherein the plurality of lookup tables are configured so as to allow a set of data entries associated with a given hash value to be divided into a first subset of data entries identified by the first lookup table and a second subset of data entries identified by the second lookup table; and if one or more associated data entries exist, identify one or more hash table locations for the one or more associated data entries based on the location information within at least one of the first lookup table and the second lookup table.

12. The method of claim 11, further comprising:

identifying, by the one or more processors, one or more data entries to be added to the hash table;

determining, by the one or more processors, whether at least one of the first lookup table and the second lookup table are to be updated in connection with the one or more data entries; and if so, updating, by the one or more processors, the index of hash values for least one of the first lookup table and the second lookup table with identifiers of one or more locations within the hash table corresponding to the one or more data entries.

13. The method of claim 12, wherein determining whether at least one of the first lookup table and the second lookup table are to be updated comprises determining whether one of the one or more data entries corresponds to a particular hash value that has been assigned to a hash table location that has been previously filled.

14. The method of claim 11, the first lookup table associates a particular hash value to a first hash table location and the second lookup table associates the particular hash value to a second hash table location.

15. The method of claim 11, wherein the first lookup table associates the plurality of hash values with locations within a first hash table and the second lookup table associates the plurality of hash values with locations within a second hash table.

16. The method of claim 15, further comprising:

identifying, by the one or more processors, a particular hash value that has been associated with a particular location within the first hash table; and determining, by the one or more processors, if the particular location within the first hash table is filled.

17. The method of claim 16, further comprising adding, by the one or more processors, a new data entry corresponding to the particular hash value to a particular location within the second hash table, if the particular location within the first hash table is filled.

18. The method of claim 17, wherein adding the new data entry comprises updating the second lookup table so as to associate the particular location within the second hash table with the particular hash value.

19. The method of claim 11, wherein the first lookup table and the second lookup table each associate the plurality of hash values with locations within a shared hash table, and wherein the one or more processors are configured to allow a particular hash value to be assigned by the first lookup table to a first location within the shared hash table and the particular hash value to be assigned by the second lookup table to a second location within the shared hash table.

20. The method of claim 11, wherein the hash table comprises one or more hash tables that are stored remotely from the first lookup table and second lookup table, and further comprising determining, without accessing the one or more hash tables, if no data entries have been associated with a particular hash value.

* * * * *